US009920794B2

(12) United States Patent
Asakura et al.

(10) Patent No.: US 9,920,794 B2
(45) Date of Patent: Mar. 20, 2018

(54) TORQUE LIMITER, VARIABLE TRANSMISSION RATIO DEVICE, AND TOLERANCE RING

(71) Applicants: JTEKT CORPORATION, Osaka-shi, Osaka (JP); TOGO SEISAKUSYO CORPORATION, Aichi-gun, Aichi-ken (JP); TOYOTA JIDOSHA KABUSHIKI KAISHA, Toyoto-shi, Aichi-ken (JP)

(72) Inventors: Toshihiro Asakura, Chiryu (JP); Masatoshi Fujimoto, Sakurai (JP); Toshiaki Ogata, Okazaki (JP); Yukihiko Kanayama, Toyokawa (JP); Hirotsune Suzuki, Toyokawa (JP); Yuji Nakamura, Aichi-ken (JP); Yuzo Hirakawa, Aichi-ken (JP); Kenji Hayashi, Nagoya (JP); Hiroyuki Toyoda, Mie-ken (JP)

(73) Assignees: JTEKT CORPORATION, Osaka-shi (JP); TOGO SEISAKUSYO CORPORATION, Aichi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 349 days.

(21) Appl. No.: 14/792,988

(22) Filed: Jul. 7, 2015

(65) Prior Publication Data

US 2015/0308511 A1    Oct. 29, 2015

Related U.S. Application Data

(62) Division of application No. 13/985,653, filed as application No. PCT/JP2012/054375 on Feb. 23, 2012, now Pat. No. 9,109,632.

(30) Foreign Application Priority Data

Mar. 4, 2011   (JP) ................................. 2011-048000
Aug. 24, 2011   (JP) ................................. 2011-182338

(51) Int. Cl.
*F16D 7/02*      (2006.01)
*B62D 5/00*      (2006.01)

(52) U.S. Cl.
CPC ............. *F16D 7/021* (2013.01); *B62D 5/008* (2013.01)

(58) Field of Classification Search
CPC . B62D 5/008; F16D 7/02; F16D 7/021; F16H 57/0482
(Continued)

(56) References Cited

U.S. PATENT DOCUMENTS 3,838,928 A    10/1974   Blaurock et al.
4,286,894 A     9/1981   Rongley
(Continued)

FOREIGN PATENT DOCUMENTS

CN       101529506 A    9/2009
EP        1985875 A1   10/2008
(Continued)

OTHER PUBLICATIONS

Apr. 3, 2015 Office Action issued in Chinese Application No. 201280011092.2.
(Continued)

*Primary Examiner* — Josh Skroupa
(74) *Attorney, Agent, or Firm* — Oliff PLC

(57) ABSTRACT

A torque limiter is configured from a ring body and a spring-form part provided in the ring body. The ring body includes a band-form metal plate and is bent approximately into a C-shape along the circumferential direction of a motor
(Continued)

shaft and a lock holder. The spring-form part is formed so as to be capable of radial elastic deformation. The spring-form part is configured from main protrusions arranged in a compressed state between the motor shaft and the lock holder, and from sub-protrusions arranged in a non-compressed state. Further, grease is stored in a part or all of the concavities formed by the main protrusions and the sub-protrusions.

4 Claims, 6 Drawing Sheets

(58) Field of Classification Search
    USPC ........................................ 464/37, 41
    See application file for complete search history.

(56) References Cited

U.S. PATENT DOCUMENTS

| | | | |
|---|---|---|---|
| 4,376,254 A | | 3/1983 | Hellmann |
| 5,819,871 A | * | 10/1998 | Takaoka ............... B62D 5/043 |
| | | | 180/444 |
| 6,854,556 B1 | | 2/2005 | Yamamoto et al. |
| 7,580,225 B2 | | 8/2009 | Hanrahan et al. |
| 7,610,671 B2 | | 11/2009 | Watkins et al. |
| 7,611,303 B2 | | 11/2009 | Hanrahan et al. |
| 7,658,677 B2 | * | 2/2010 | Needes ............... F16C 27/02 |
| | | | 464/162 |
| 7,850,389 B2 | | 12/2010 | Hanrahan et al. |
| 8,385,024 B2 | | 2/2013 | Schmidt et al. |
| 8,684,624 B2 | | 4/2014 | Slayne |
| 2005/0070365 A1 | | 3/2005 | Riefe et al. |
| 2005/0209039 A1 | | 9/2005 | Kempf |
| 2008/0043375 A1 | | 2/2008 | Hanrahan et al. |
| 2008/0247815 A1 | * | 10/2008 | Slayne ............... F16B 19/02 |
| | | | 403/372 |
| 2008/0266717 A1 | | 10/2008 | Court et al. |
| 2008/0267693 A1 | | 10/2008 | Court et al. |
| 2009/0031852 A1 | * | 2/2009 | Yamamori ............ B62D 5/008 |
| | | | 74/650 |
| 2009/0142180 A1 | | 6/2009 | Munson |
| 2009/0256341 A1 | * | 10/2009 | Okada ............... B62D 1/181 |
| | | | 280/775 |
| 2010/0073820 A1 | | 3/2010 | Slayne et al. |
| 2011/0150377 A1 | | 6/2011 | Hartmann |

FOREIGN PATENT DOCUMENTS

| | | |
|---|---|---|
| EP | 2012025 A1 | 1/2009 |
| JP | H09-20256 A | 1/1997 |
| JP | 2001-159429 A | 6/2001 |
| JP | 2002-308119 A | 10/2002 |
| JP | 2008-038990 A | 2/2008 |
| JP | 2010-525276 A | 7/2010 |

OTHER PUBLICATIONS

Mar. 19, 2012, International Search Report issued in International Application No. PCT/JP2012/054375.

* cited by examiner (Hm>Hs)

(Lm>R>Ls)

(Hm>Hs)

Fig.7(a) Fig.7(b) Fig.7(c)
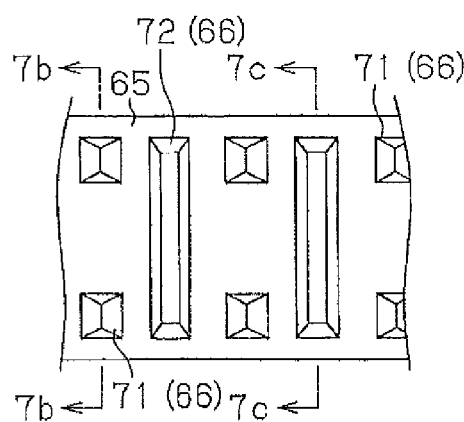
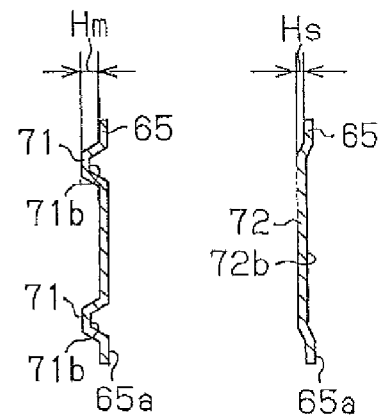
Fig.8
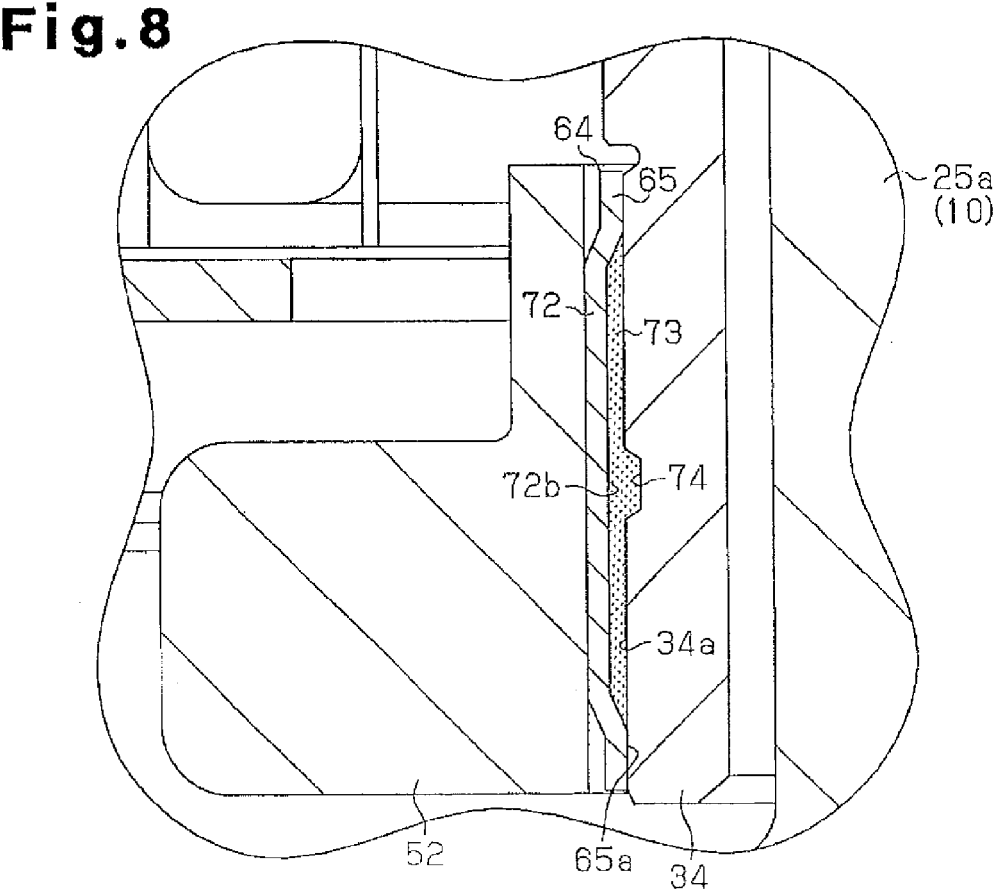

TORQUE LIMITER, VARIABLE TRANSMISSION RATIO DEVICE, AND TOLERANCE RING

CROSS-REFERENCE TO RELATED APPLICATIONS

This application is a divisional of U.S. patent application Ser. No. 13/985,653, filed Aug. 15, 2013, pending, which is a National Stage of PCT International Application No. PCT/JP2012/054375, filed Feb. 23, 2012.

FIELD OF THE INVENTION

The present invention relates to a torque limiter, a variable transmission ratio device, and a tolerance ring.

BACKGROUND OF THE INVENTION

Conventionally, a variable transmission ratio device which uses a differential mechanism and adds rotation based on motor driving to rotation of an input shaft based on a steering operation and transmits the added rotations to an output shaft is known. Patent Document 1 discloses a housing-fixed type variable transmission ratio device in which a housing for housing a differential mechanism and a motor is fixed to a vehicle body of a motor vehicle. The variable transmission ratio device disclosed in this document includes a locking device. The locking device suppresses idling of a motor shaft when power supply to the motor is stopped, and restrains rotation of the motor shaft to enable torque transmission between the input shaft and the output shaft.

As shown in FIG. 9, a locking device 81 described in Patent Document 1 includes a lock holder 83 integrated with a motor shaft 82, and a lock arm 84. The lock arm 84 is provided on a housing (not illustrated) fixed to a vehicle body. On an outer peripheral surface 83a of the lock holder 83, engagement grooves 85 are formed. Each of the engagement grooves 85 has end wall portions 86 on both end portions in the circumferential direction. When the lock arm 84 is inserted into the engagement groove 85 and an engagement portion 87 of the lock arm 84 is engaged with one of both end wall portions 86, rotation of the motor shaft 82 is locked. When the lock holder 83 rotates in a state where a side surface 86a of the end wall portion 86 is engaged with the side surface 87a of the engagement portion 87, the engagement portion 87 is pulled radially inward by the side surface 86a. Therefore, in the locked state, even when a torque is input into the lock holder 83, the lock arm 84 does not come out from the engagement groove 85. The locking device 81 includes a tolerance ring 91 between the motor shaft 82 and the lock holder 83. In FIG. 9, for convenience of description, the tolerance ring 91 is illustrated in an exaggerated manner.

The tolerance ring 91 includes a ring main body 92 formed by curving a band-shaped metal plate substantially into a C-shape. On the ring main body 92, spring-like portions 93 elastically deformable in the radial direction are formed. In the case of Patent Document 1, the spring-like portions 93 consist of a plurality of protrusions 94 protruding radially outward from the vicinity of the center of the ring main body 92. The protruding amounts of the protrusions 94 are fixed. The protrusions 94 are respectively disposed at even angular intervals in the circumferential direction. The tolerance ring 91 is press-fitted between the motor shaft 82 and the lock holder 83 in a state where the respective protrusions 94 are radially compressed. Therefore, on the tolerance ring 91, frictional resistance is caused by the elastic forces of the respective protrusions 94. Accordingly, the frictional resistance between the spring-like portions 93 of the tolerance ring 91 and the lock holder 83 restricts the motor shaft 82 and the lock holder 83 from rotating relative to each other. When a torque equal to or more than a predetermined value is input, the spring-like portions 93 of the tolerance ring 91 become slipping surfaces and allow the motor shaft 82 and the lock holder 83 to rotate relative to each other. Thus, the tolerance ring 91 functions as a torque limiter. By allowing the motor shaft 82 and the lock holder 83 to rotate relative to each other by the tolerance ring 91, when the differential mechanism is abnormal, a steering operation can be continuously performed. A maximum torque at which the motor shaft 82 and the lock holder 83 can be restricted from rotating relative to each other is referred to as a slipping torque.

Relative rotation of the motor shaft 82 and the lock holder 83 is allowed by the tolerance ring 91 for a fail-safe measure that enables a steering operation when the differential mechanism is abnormal. Therefore, relative rotation of the motor shaft 82 and the lock holder 83 in a normal state is not preferable from the viewpoint of security of reliability, etc., of the device. However, in a case where steering to a steering end is performed and then further steering over the steering end is performed, when the motor shaft 82 is locked during high-speed rotation, at the moment at which the engagement portion 87 of the lock arm 84 is engaged with the end wall portion 86 of the engagement groove 85, a great impact is applied to the lock holder 83.

In detail, when the end wall portion 86 collides with the engagement portion 87 at the time of locking, the lock arm 84 is pulled radially inward by the side surface 86a of the end wall portion 86. Accordingly, the engagement portion 87 also collides with the bottom surface of the engagement groove 85. When an impact is thus applied to the lock holder 83 in both the circumferential direction and the radial direction, the shaft center of the lock holder 83 may deviate from the shaft center of the motor shaft 82. At this time, while the compressed amount of the protrusions 94 near the lock arm 84 increases, the compressed amount of the protrusions 94 on the opposite side of the lock arm 84 decreases.

Here, when the protrusion 94 is compressed to near the limit of the elastically deformable range, the increased amount of the elastic force according to the increase in the compressed amount becomes smaller. In particular, the tolerance ring 91 to be used in the variable transmission ratio device is small in size, and the protruding amounts of the protrusions 94 are also as small as 1 mm. Therefore, the protrusions 94 are easily compressed to near the limit of the elastically deformable range. Therefore, the increased amount of the elastic force of the protrusion 94 the compressed amount of which was increased becomes relatively small, and the decreased amount of the elastic force of the protrusion 94 the compressed amount of which was decreased becomes relatively large. As a result, the frictional resistance of the whole tolerance ring 91 becomes small, and the slipping torque decreases at the time of locking. Accordingly, the motor shaft 82 and the lock holder 83 are likely to rotate relative to each other.

Therefore, to secure a sufficient slipping torque at the time of locking, it can also be considered that the protruding amounts of the protrusions 94 are increased and the slipping torque of the tolerance ring 91 is set to be large in advance. However, in this case, in a state where the shaft center of the motor shaft 82 and the shaft center of the lock holder 83 match each other, the slipping torque becomes excessively large. The above-described problem occurs not only in a variable transmission ratio device but also in a torque limiter including a shaft-shaped first rotating member, a second rotating member that is fitted on the first rotating member, and a tolerance ring disposed between the first and second rotating members when an impact is applied to the second rotating member.

PRIOR ART DOCUMENT

Patent Document

Patent Document 1: Japanese Laid-Open Patent Publication No. 2008-38990

SUMMARY OF THE INVENTION

An object of the present invention is to provide a torque limiter, a variable transmission ratio device, and a tolerance ring which can suppress a decrease in a slipping torque due to an impact.

To solve the problem, a first aspect of the present invention provides a torque limiter which includes a shaft-shaped first rotating member, a second rotating member fitted on the outer periphery of the first rotating member, and a tolerance ring interposed between the first rotating member and the second rotating member, where relative rotation of the first rotating member and the second rotating member is restricted or allowed based on frictional resistance of the tolerance ring. The tolerance ring includes a ring main body extending in the circumferential direction of each rotating member, and on the ring main body, spring-like portions elastically deformable in the radial direction are formed, and according to the elastic forces of the spring-like portions, frictional resistance is caused between the ring main body and the first rotating member or second rotating member, and the spring-like portions consist of a plurality of main protrusions disposed in a compressed state between the first rotating member and the second rotating member and a plurality of sub-protrusions the protruding amount of which is smaller than that of the main protrusions.

According to this configuration, the protruding amount of the sub-protrusions is smaller than that of the main protrusions. Therefore, when the main protrusion is compressed to near the limit of the elastically deformable range, the increased amount of the elastic force according to the increase in the compressed amount becomes smaller. On the other hand, the increased amount of the elastic force according to an increase in the compressed amount of the sub-protrusion hardly becomes smaller. Therefore, in comparison with the case where the protruding amounts of the protrusions comprising the spring-like portions are the same, the increased amount of the elastic force according to an increase in the compressed amount can be made larger. Specifically, on the opposite side of a portion to which an impact is applied, the compressed amounts of the main protrusions and the sub-protrusions decrease and the elastic forces become smaller, and on the other hand, at the portion to which an impact is applied, the increased amounts of the elastic forces according to an increase in the compressed amount of the main protrusions and the sub-protrusions do not become smaller. Therefore, a decrease in the frictional resistance of the whole tolerance ring can be suppressed, and a decrease in the slipping torque can be suppressed. Thus, by forming main protrusions and sub-protrusions which are different in protruding amount, a sufficient slipping torque can be secured at the time of locking. Therefore, a slipping torque in a state where the shaft center of the first rotating member and the shaft center of the second rotating member match each other can be set to a proper value.

In the above-described torque limiter, the sub-protrusions are preferably disposed in an uncompressed state between the first rotating member and the second rotating member.

With this configuration, in a state where the shaft center of the first rotating member and the shaft center of the second rotating member match each other, the frictional resistance between the sub-protrusions and the first rotating member or second rotating member is zero. However, due to an impact, when the shaft center of the second rotating member deviates from the shaft center of the first rotating member and the sub-protrusions are compressed, frictional resistance newly occurs between the sub-protrusions and the first rotating member or second rotating member. Accordingly, the slipping torque increases. With this configuration, the sub-protrusions are not compressed in the state where the shaft center of the first rotating member and the shaft center of the second rotating member match each other, so that the slipping torque can be determined only by the frictional resistance according to the elastic forces of the main protrusions. Specifically, unlike the case where the sub-protrusions are disposed in a compressed state, there is no need to strictly manage the protruding amounts of the sub-protrusions. Therefore, fluctuation of the slipping torque among torque limiters can be suppressed, and this contributes to a reduction in manufacturing costs.

In the above-described torque limiter, the main protrusions and the sub-protrusions are preferably disposed in an alternate manner at even angular intervals in the circumferential direction of the ring main body.

With this configuration, regardless of the position at which an impact is applied, a decrease in the slipping torque can be suppressed.

In the above-described torque limiter, preferably, at least one of the main protrusions and sub-protrusions are respectively disposed near the open ends of the ring main body at an interval in the axial direction of the ring main body.

When an impact is applied to the second rotating member (lock holder), the axis of the second rotating member may be tilted with respect to the axis of the first rotating member (motor shaft). In this case, the contact states between the main protrusions, the sub-protrusions and the first rotating member or second rotating member become uneven, and the frictional resistance may decrease. In this regard, with this configuration, by forming at least one of the main protrusions and sub-protrusions as described above, the second rotating member can be made hard to tilt with respect to the first rotating member in comparison with the case where the main protrusions and sub-protrusions are formed only near the center in the axial direction of the ring main body. Therefore, a decrease in the frictional resistance between the main protrusions, the sub-protrusions and the first rotating member or second rotating member can be suppressed.

In the above-described torque limiter, preferably, on the ring main body, concavities are formed by the main protrusions and the sub-protrusions, grease is interposed between the concave peripheral surfaces of the concavities and contact surfaces of the first rotating member which are brought into contact with the concave peripheral surfaces, and on the contact surfaces, an annular groove extending in the circumferential direction of the first rotating member is formed, and the annular groove is formed at a position opposite to the concavities of at least one of the main protrusions and the sub-protrusions.

With this configuration, grease is present between the concave peripheral surfaces of the ring main body and the contact surfaces of the motor shaft. Therefore, the concave peripheral surfaces of the tolerance ring become slipping surfaces and rotate relative to the first rotating member or second rotating member. Accordingly, the first rotating member and the second rotating member are allowed to rotate relative to each other. Grease is stored in the concavities and annular groove, so that a sufficient amount of grease can be secured between the concave peripheral surfaces and the contact surfaces. Therefore, relative rotation of the first rotating member and the second rotating member is enabled.

To solve the above-described problem, a second aspect of the present invention provides a variable transmission ratio device which includes a differential mechanism that adds rotation based on motor driving to rotation of an input shaft based on a steering operation and transmits the added rotations to an output shaft, and a locking device for restraining a non-rotating member that is not rotated according to rotation of the input shaft and the motor shaft so that they become incapable of rotating relative to each other, where the locking device includes a lock holder that is integrated with the motor shaft and has engagement grooves, and a lock arm that engages with the engagement groove to restrain rotation of the lock holder, a tolerance ring is interposed between the motor shaft and the lock holder, and based on frictional resistance of the tolerance ring, the motor shaft and the lock holder are restricted from rotating relative to each other or allowed to rotate relative to each other. The tolerance ring includes a ring main body extending in the circumferential direction of the motor shaft and the lock holder, spring-like portions elastically deformable in the radial direction are formed on the ring main body, frictional resistance occurs between the ring main body and the motor shaft or lock holder according to elastic forces of the spring-like portions, and the spring-like portions consist of a plurality of main protrusions disposed in a compressed state between the motor shaft and the lock holder and a plurality of sub-protrusions the protruding amount of which is smaller than that of the main protrusions.

With the above-described configuration, even if the shaft center of the lock holder deviates from the shaft center of the motor shaft due to an impact at the time of locking, a decrease in the slipping torque can be suppressed by the main protrusions and the sub-protrusions of the tolerance ring. Accordingly, rotation of the motor shaft and the lock holder can be suppressed relative to each other due to an impact at the time of locking, and the reliability of the variable transmission ratio device is improved.

In the above-described variable transmission ratio device, the sub-protrusions are preferably disposed in an uncompressed state between the motor shaft and the lock holder.

With the above-described configuration, the slipping torque is improved when an impact is applied. In addition, there is no need to strictly manage the protruding amount of the sub-protrusions, fluctuation of the slipping torque among the variable transmission ratio devices can be suppressed, and the manufacturing costs can also be reduced.

In the above-described variable transmission ratio device, the main protrusions and the sub-protrusions are preferably disposed at even angular intervals in an alternate manner in the circumferential direction of the ring main body.

In the above-described variable transmission ratio device, preferably, at least one of the main protrusions and the sub-protrusions are respectively disposed near the open ends of the ring main body at an interval in the axial direction of the ring main body.

In the above-described variable transmission ratio device, on the ring main body, preferably, concavities are formed by the main protrusions and the sub-protrusions, grease is interposed between the concave peripheral surfaces of the concavities and contact surfaces of the motor shaft which are brought into contact with the concave peripheral surfaces, an annular groove extending in the circumferential direction of the motor shaft is formed on the contact surfaces, the annular groove is preferably formed at a position opposite to the concavities of at least one of the main protrusions and the sub-protrusions.

To solve the above-described problem, a third aspect of the present invention provides a tolerance ring including a ring main body substantially in a ring shape, and spring-like portions which are formed on the ring main body and elastically deformable in the radial direction. The spring-like portions consist of a plurality of main protrusions and a plurality of sub-protrusions the protruding amount of which is smaller than that of the main protrusions, and grease is stored in all or a part of concavities formed by the main protrusions and the sub-protrusions.

With the above-described configuration, a decrease in the slipping torque can be suppressed by the main protrusions and the sub-protrusions of the tolerance ring even when an impact is applied. Further, grease is stored in the concavities formed by the main protrusions and the sub-protrusions, so that when a torque equal to or more than the slipping torque is input, the motor shaft and the lock holder which sandwich the tolerance ring are allowed to rotate relative to each other. Accordingly, by applying the tolerance ring according to the present invention to a locking device of a variable transmission ratio device, a steering operation can be continuously performed even when the differential mechanism of the locking device is abnormal.

In the above-described tolerance ring, preferably, the main protrusions and the sub-protrusions are respectively disposed at even angular intervals in an alternate manner in the circumferential direction of the ring main body.

In the above-described tolerance ring, at least one of the main protrusions and the sub-protrusions are preferably formed near the open ends of the ring main body at an interval in the axial direction of the ring main body.

BRIEF DESCRIPTION OF THE DRAWINGS

FIG. 7(a) is a partial side view showing a tolerance ring according to a third embodiment of the present invention, FIG. 7(b) is a partial sectional view taken along a line 7b-7b in FIG. 7(a), and FIG. 7(c) is a partial sectional view taken along a line 7c-7c in FIG. 7(a).

FIG. 8 is a partial sectional view showing the vicinity of the tolerance ring according to the third embodiment of the present invention in an enlarged manner.

DETAILED DESCRIPTION OF THE PREFERRED EMBODIMENTS

First Embodiment

Hereinafter, a first embodiment that embodies the present invention is described with reference to FIG. 1 to FIG. 5. The present invention is described by defining the upper side and the lower side as shown in FIG. 2.

Figure 1:
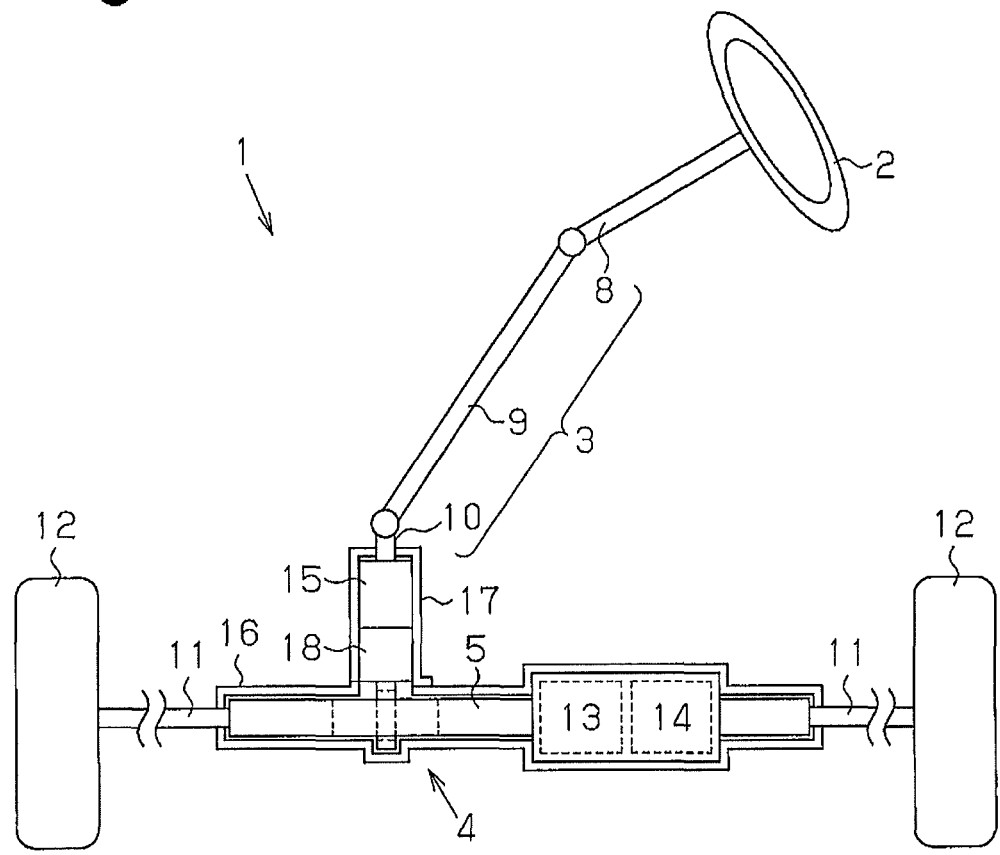
FIG. 1 is a schematic diagram of a vehicle steering apparatus with a variable transmission ratio device according to the present invention.
Figure 2:
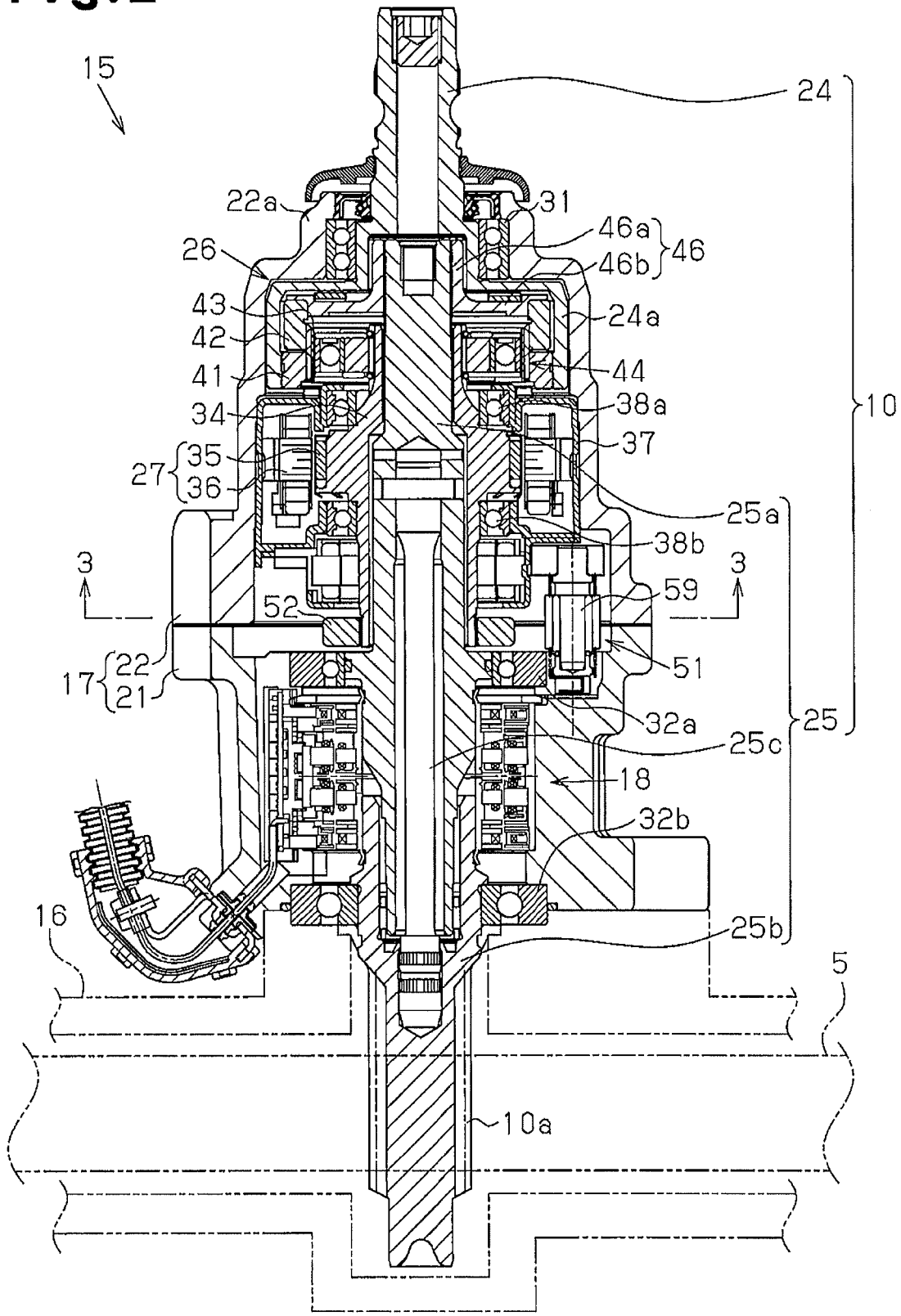
FIG. 2 is a sectional view of the variable transmission ratio device.

As shown in FIG. 1, in a vehicle steering apparatus 1, a steering wheel 2 is fixed to a steering shaft 3. The steering shaft 3 is joined to a rack shaft 5 by a rack-and-pinion mechanism 4. Rotation of the steering shaft 3 according to a steering operation is converted into reciprocating linear movement of the rack shaft 5 by the rack-and-pinion mechanism 4. In the steering shaft 3, a column shaft 8, an intermediate shaft 9, and a pinion shaft 10 are joined to each other. To both ends of the rack shaft 5, tie rods 11 are joined, respectively. Reciprocating linear movement of the rack shaft 5 according to rotation of the steering shaft 3 is transmitted to knuckles (not illustrated) via the tie rods 11. Accordingly, the turning angle of steered wheels 12, that is, the advancing direction of the vehicle is changed.

The vehicle steering apparatus 1 is configured as a so-called rack-assist type electric power steering apparatus which moves the rack shaft 5 in an axial direction by using the motor 13. The vehicle steering apparatus 1 applies a motor torque as an assist force to a steering system by converting rotation of the motor 13 into reciprocating movement of the rack shaft 5 by a ball screw mechanism 14 and transmitting the same.

The vehicle steering apparatus 1 includes a variable transmission ratio device 15 that varies a ratio of a turning angle (tire angle) of the steered wheels 12 to the turning angle (steering angle) of the steering wheel 2, that is, a transmission ratio (steering gear ratio). The variable transmission ratio device 15 is provided on the pinion-shaft 10 constituting the steering shaft 3. To the vehicle body (not illustrated) of the motor vehicle, a rack housing 16 including a pinion housing 17 is fixed. The variable transmission ratio device 15 is housed in the pinion housing 17. On the pinion shaft 10, a torque sensor 18 for detecting a steering torque to be used to control the assist force is provided.

As shown in FIG. 2, the pinion housing 17 includes a lower housing 21 and an upper housing 22. The lower housing 21 is fixed to the upper portion of the rack housing 16 and formed substantially into a cylindrical shape. The upper housing 22 is fixed to the upper end of the lower housing 21 and formed substantially into a cylindrical shape. The pinion shaft 10 is inserted into the pinion housing 17. At the lower end of the pinion shaft 10, pinion teeth 10a are formed. The pinion shaft 10 is supported rotatably in a state where the pinion shaft is meshed with rack teeth (not illustrated) of the rack shaft 5 via the pinion teeth 10a.

The pinion shaft 10 includes an input shaft 24 and an output shaft 25 including the pinion teeth 10a. As shown in FIG. 1, into an input shaft 24 joined to the intermediate shaft 9, rotation according to a steering operation is input. The variable ratio transmission device 15 includes a wave gear mechanism 26 and a motor 27 that drives the wave gear mechanism 26. The wave gear mechanism 26 and the motor 27 are housed in the upper housing 22. The wave gear mechanism 26 functions as a differential mechanism interposed between the input shaft 24 and the output shaft 25.

The input shaft 24 is supported rotatably with respect to the upper end portion 22a of the upper housing 22 via a bearing 31. The output shaft 25 is supported rotatably with respect to the lower housing 21 via bearings 32a and 32b. The upper end of the output shaft 25 is made to project to the inside of the upper housing 22. The output shaft 25 includes a first shaft member 25a that is joined to the wave gear mechanism 26, a second shaft member 25b including the pinion teeth 10a, and a torsion bar 25c that joins the first and second shaft members 25a and 25b. The torque sensor 18 measures a torsion angle of the torsion bar 25c to detect a steering torque to be input into the steering system.

The motor 27 includes a rotor 35 and a stator 36 that generates a rotating magnetic field that rotates the rotor 35. The rotor 35 includes a hollow motor shaft 34. To the inner peripheral surface of the upper housing 22, a motor housing 37 is fixed. The stator 36 is disposed inside the motor housing 37. The rotor 35 is supported rotatably with respect to the motor housing 37 via bearings 38a and 38b. The upper end of the output shaft 25 is inserted into the inside of the motor shaft 34 and extends to the vicinity of the upper end portion 22a of the upper housing 22.

The wave gear mechanism 26 is disposed adjacent to the upper side of the motor 27. The wave gear mechanism 26 includes a pair of circular splines 41 and 42 disposed coaxially, a tubular flex spline 43, and a wave generator 44. The flex spline 43 partially meshes with the circular splines 41 and 42, and is disposed coaxially with the respective circular splines 41 and 42. The wave generator 44 rotates the meshing portion of the flex spline 43 according to driving of the motor.

The number of teeth of the circular spline 41 is different from that of the circular spline 42. The flex spline 43 is disposed inside the circular splines 41 and 42 in a state where the flex spline is warped substantially into a oval shape. Therefore, the external teeth of the flex spline 43 are partially meshed with the internal teeth of the circular splines 41 and 42, respectively. To the circular spline 41 adjacent to the motor 27, the input shaft 24 is joined. To the circular spline 42 adjacent to the upper end portion 22a of the upper housing 22, the upper end of the output shaft 25 projecting toward the upper end portion 22a of the upper housing 22 is joined.

In detail, the output shaft 25 (first shaft member 25a) is joined to the circular spline 42 via a joint member 46. The joint member 46 includes a tubular portion 46a fitted to the outer periphery of the output shaft 25 and a flange portion 46b extending radially outward along the lower end of the tubular portion 46a. The flange portion 46b is fitted to the inner peripheral surface of the circular spline 42. On the lower end of the input shaft 24, a tubular portion 24a having an inner radius larger than outer radiuses of the circular splines 41 and 42 is formed. Inside the tubular portion 24a, the wave gear mechanism 26 and the joint member 46 are housed. The inner peripheral surface of the tubular portion 24a is press-fitted in and fitted to the outer peripheral surface of the circular spline 41. Thus, the input shaft 24 is joined to the circular spline 41 via the tubular portion 24a.

The wave generator 44 is disposed inside the flex spline 43. The wave generator 44 is joined to the upper end of the motor shaft 34. The wave generator 44 rotates the oval shape of the flex spline 43, that is, the meshing portion between the flex spline 43 and the both circular splines 41 and 42 according to driving of the motor 27. Thus, by motor-driving the wave gear mechanism 26 joined to each of the input shaft 24, the output shaft 25, and the motor shaft 34, the transmission ratio between the steering wheel 2 and the steered wheels 12 is changed.

In detail, rotation of the input shaft 24 according to a steering operation is transmitted to the circular spline 41, the flex spline 43, and the circular spline 42 joined to the input shaft 24 in order, and then transmitted to the output shaft 25. Then, the wave generator 44 is driven by the motor 27, and the oval shape of the flex spline 43, that is, the meshing portion between the flex spline 43 and the both circular splines 41 and 42 rotates. At this time, a rotation difference based on the difference in the number of teeth between the both circular splines 41 and 42 is added as rotation based on motor driving to rotation based on a steering operation and transmitted to the output shaft 25. Accordingly, a rotation transmission ratio between the input shaft 24 and the output shaft 25, that is, a transmission ratio between the steering wheel 2 and the steered wheels 12 is changed.

The variable transmission ratio device 15 includes a locking device 51 below the motor 27. The locking device 51 locks the motor shaft 34 so that the motor shaft 34 becomes incapable of rotating with respect to the upper housing 22. The upper housing 22 and the lower housing 21 are fixed to the rack housing 16. Therefore, even when the input shaft 24 rotates, the upper housing 22 and the lower housing 21 that are non-rotating members do not rotate. According to actuation of the locking device 51, the transmission ratio can be mechanically fixed as appropriate.

Figure 3:
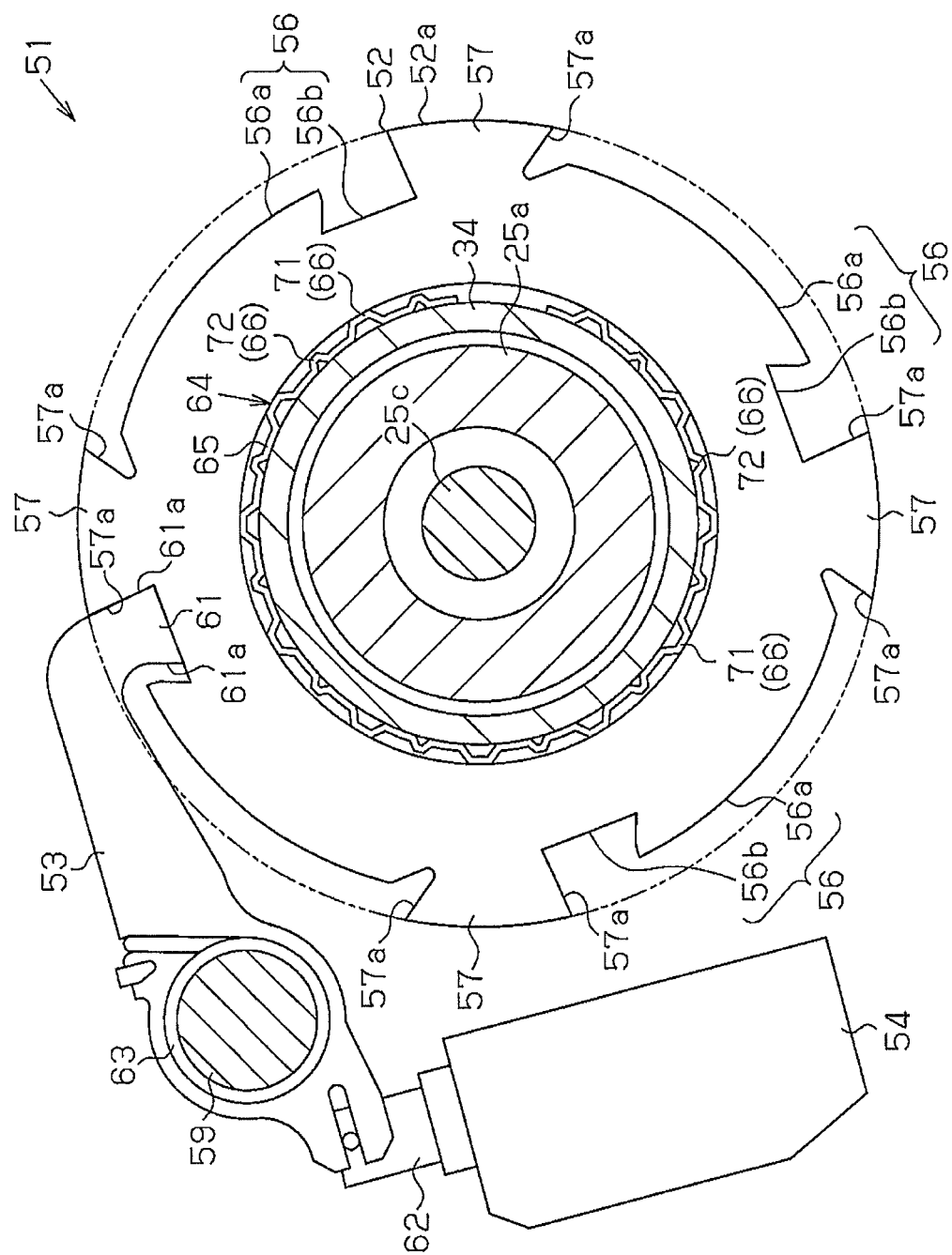
FIG. 3 is a sectional view taken along a line 3-3 in FIG. 2.

As shown in FIG. 3, the locking device 51 includes a lock holder 52 fixed to the motor shaft 34, a lock arm 53 that restrains rotation of the lock holder 52, and a solenoid 54 that drives the lock arm 53. The lock holder 52 is formed substantially into a ring shape, and fixed to the motor shaft 34. On the outer peripheral surface 52a of the lock holder 52, four engagement grooves 56 are formed at intervals of 90°. The respective engagement grooves 56 penetrate the lock holder 52 in the thickness direction of the lock holder 52, and extend in the circumferential direction of the lock holder 52. Each engagement groove 56 consists of a shallow groove 56a extending in the circumferential direction and a deep groove 56b provided on one of the end portions of the shallow groove 56a. Between two engagement grooves 56 adjacent to each other, an end wall portion 57 is formed.

The support shaft 59 is disposed on the radially outer side of the lock holder 52. The lock arm 53 is joined turnably with respect to the support shaft 59. On the tip end of the lock arm 53, an engagement portion 61 that projects toward the outer peripheral surface 52a of the lock holder 52 is formed. To the base end of the lock arm 53, a shaft-shaped plunger 62 is joined. According to driving of the solenoid 54, the plunger 62 is movable in the axial direction thereof. The support shaft 59 and the solenoid 54 are fixed onto the motor housing 37 of the motor 27 fixed to the upper housing 22. Around the support shaft 59, a torsion coil spring 63 is attached. The lock arm 53 is energized by an elastic force of the torsion coil spring 63 so as to turn the engagement portion 61 toward the lock holder 52. By inserting the engagement portion 61 into the engagement groove 56 and engaging the engagement portion 61 with the end wall portion 57, rotation of the motor shaft 34 is locked.

When the lock holder 52 rotates in a state where the side surface 57a of the end wall portion 57 engages with the engagement portion 61, the engagement portion 61 is pressed radially inward and pulled-in by the side surface 57a. The side surface 57a of the end wall portion 57 is tilted to approach the center of the engagement groove 56 toward the radially outer side. Each side surface 61a of the engagement portion 61 is substantially parallel to the side surface 57a of the end wall portion 57 opposite to the side surface 61a. Therefore, when a steering operation is performed in a locked state, the lock arm 53 is pressed against the lock holder 52, so that it does not come out from the engagement groove 56.

The locking device 51 further includes a tolerance ring 64 between the motor shaft 34 and the lock holder 52. In FIG. 3, the tolerance ring 64 is illustrated in an exaggerated manner.

The tolerance ring 64 includes a ring main body 65 formed by curving a band-shaped metal plate substantially in a C-shape. On the ring main body 65, a plurality of spring-like portions 66 elastically deformable in the radial direction are formed. The tolerance ring 64 is press-fitted between the motor shaft 34 and the lock holder 52 in a state where the respective spring-like portions 66 are compressed in the radial direction. Therefore, on the tolerance ring 64, frictional resistance is caused by elastic forces of the spring-like portions 66. The frictional resistance between the spring-like portions 66 of the tolerance ring 64 and the lock holder 52 restricts the motor shaft 34 and the lock holder 52 from rotating relative to each other. When a torque equal to or more than a predetermined value is input, the outer peripheral surface of the tolerance ring 64 becomes a slipping surface and allows the motor shaft 34 and the lock holder 52 to rotate relative to each other. Thus, the tolerance ring 64 functions as a torque limiter. In the present embodiment, the motor shaft 34 corresponds to the first rotating member, and the lock holder 52 corresponds to the second rotating member. A maximum torque at which the relative rotation of the motor shaft 34 and the lock holder 52 can be restricted is called a slipping torque.

When an electric current is applied to the solenoid 54, the lock arm 53 turns the engagement portion 61 outward in the radial direction of the lock holder 52 against the elastic force of the torsion coil spring 63. Accordingly, the motor shaft 34 becomes rotatable with respect to the upper housing 22, and is brought into an unlocked state. In the unlocked state, rotation based on motor driving is added to the rotation of the input shaft 24 based on a steering operation and transmitted to the output shaft 25.

When application of an electric current to the solenoid 54 is stopped, the lock arm 53 turns the engagement portion 61 toward the lock holder 52. Then, the engagement portion 61 is inserted into the engagement groove 56 and engages with the end wall portion 57, and accordingly, the lock holder 52 becomes incapable of rotating with respect to the upper housing 22, and is brought into a locked state. In the locked state, even if power supply to the motor 27 is stopped, the motor shaft 34 does not idle with respect to the stator 36, and torque transmission between the input shaft 24 and the output shaft 25 is enabled. In the locked state, due to biting of foreign matter in the wave gear mechanism 26, etc., the input shaft 24 and the output shaft 25 may become incapable of rotating relative to the motor shaft 34. In such a case, when a torque equal to or more than the slipping torque is input, the input shaft 24 and the output shaft 25 rotate together with the motor shaft 34 with respect to the upper housing 22. Accordingly, even in an abnormal state, the steering operation can be continuously performed.

(Tolerance Ring)

Next, the above-described tolerance ring is described in detail with reference to FIG. 3 to FIG. 5.

When the motor shaft 34 is locked during high-speed rotation, the lock arm 53 is pulled-in by the side surface 57a of the end wall portion 57. Therefore, at the moment at which the engagement portion 61 engages with the end wall portion 57, the lock arm 53 is energized radially inward, and the engagement portion 61 also collides with the bottom surface of the engagement groove 56. Thus, by applying an impact to the lock holder 52 in both the circumferential direction and the radial direction, the shaft center of the lock holder 52 may deviate from the shaft center of the motor shaft 34. By taking this into account, as shown in FIG. 3, the spring-like portions 66 of the tolerance ring 64 consist of a plurality of main protrusions 71 and a plurality of sub-protrusions 72. In a state where the lock holder 52 is assembled coaxially with the motor shaft 34, the main protrusions 71 are respectively disposed in a compressed state between the motor shaft 34 and the lock holder 52. On the other hand, the sub-protrusions 72 are disposed in an uncompressed state.

Figure 4A:
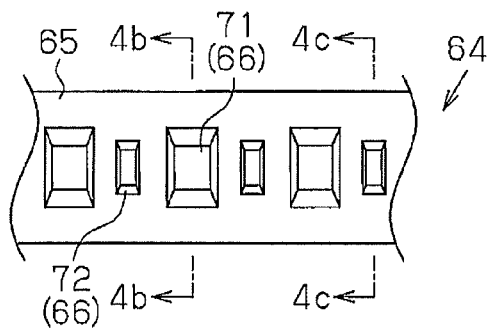
FIG. 4(a) is a partial side view showing a tolerance ring according to a first embodiment of the present invention.
Figures 4B, 4C:
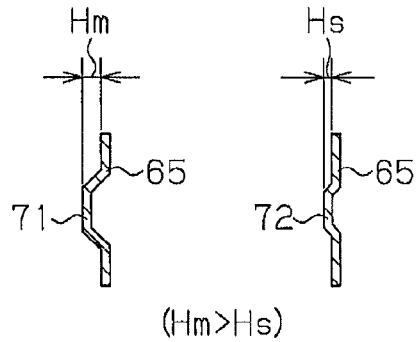
FIG. 4(b) is a partial sectional view taken along a line 4b-4b in FIG. 4(a)
FIG. 4(c) is a partial sectional view taken along a line 4c-4c in FIG. 4(a).
Figure 5:
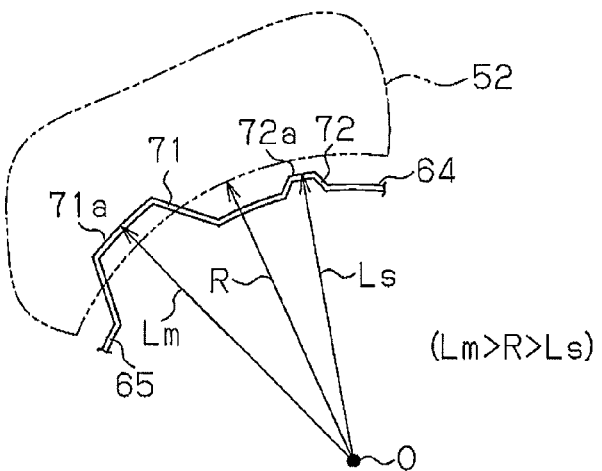
FIG. 5 is a schematic view showing the relationship among the inner radius of the lock holder, the length between the main protrusion and the center of the tolerance ring, and the length between the sub-protrusion and the center of the tolerance ring.

As shown in FIG. 3 and FIG. 4(a) to FIG. 4(c), the main protrusions 71 and the sub-protrusions 72 protrude radially outward from the ring main body 65. The main protrusions 71 and the sub-protrusions 72 are formed substantially into trapezoidal quadrangular pyramids. The protruding amount Hm of the main protrusions 71 is larger than the protruding amount Hs of the sub-protrusions 72. As shown in FIG. 5, the length Lm from the center O of the tolerance ring 64 to the top surface 71a of the main protrusion 71 is larger than the inner radius R of the lock holder 52. Therefore, the main protrusions 71 are brought into contact with the inner peripheral surface of the lock holder 52 and compressed by the motor shaft 34 and the lock holder 52. On the other hand, the length Ls from the center O of the tolerance ring 64 to the top surface 72a of the sub-protrusion 72 is smaller than the inner radius R of the lock holder 52. Therefore, the sub-protrusions 72 are not brought into contact with the inner peripheral surface of the lock holder 52 and not compressed. As shown in FIG. 4(a), the main protrusions 71 and the sub-protrusions 72 are respectively disposed at even angular intervals in an alternate manner in the circumferential direction of the ring main body 65. The main protrusions 71 and the sub-protrusions 72 are formed near the center in the axial direction of the ring main body 65.

According to the above-described variable transmission ratio device 15, in a state where the shaft center of the motor shaft 34 and the shaft center of the lock holder 52 match each other, the frictional resistance caused by the elastic forces of the main protrusions 71 restricts the motor shaft 34 and the lock holder 52 from rotating relative to each other. On the other hand, in a state where an impact is applied and the shaft center of the lock holder 52 deviates from the shaft center of the motor shaft 34, the sub-protrusions 72 near the lock arm 53 to which the impact is applied are compressed by the motor shaft 34 and the lock holder 52. Therefore, in addition to the frictional resistance of the main protrusions 71, the frictional resistance caused by the elastic forces of the sub-protrusions 72 also restricts the motor shaft 34 and the lock holder 52 from rotating relative to each other.

As described above, the first embodiment provides the following operations and effects.

(1) The tolerance ring 64 has spring-like portions 66 protruding radially outward from the ring main body 65. The spring-like portions 66 consist of the main protrusions 71 disposed in a compressed state between the motor shaft 34 and the lock holder 52, and the sub-protrusions 72 disposed in a non-compressed state. With this configuration, in a state where the shaft center of the motor shaft 34 and the shaft center of the lock holder 52 match each other, the frictional resistance between the sub-protrusions 72 and the lock holder 52 is zero. On the other hand, when the shaft center of the lock holder 52 deviates from the shaft center of the motor shaft 34 and the sub-protrusions 72 are compressed at the time of locking, frictional resistance is caused between the sub-protrusions 72 and the lock holder 52. Accordingly, the slipping torque increases at the time of locking. Therefore, due to the impact applied at the time of locking, the motor shaft 34 and the lock holder 52 become incapable of rotating relative to each other, and this improves the reliability of the variable transmission ratio device 15. In addition, with this configuration, the protruding amounts of the main protrusions 71 and the sub-protrusions 72 are different from each other, so that a sufficient slipping torque can be secured at the time of locking. Therefore, the slipping torque in a state where the shaft center of the motor shaft 34 and the shaft center of the lock holder 52 match each other can be set to a proper value. Therefore, when the wave gear mechanism 26 is abnormal, even without applying an excessive steering force, a steering operation can be continuously performed.

In the state where the shaft center of the motor shaft 34 and the shaft center of the lock holder 52 match each other, the sub-protrusions 72 are not compressed. Therefore, the above-described slipping torque can be determined only by the frictional resistance caused by the elastic forces of the main protrusions 71. Specifically, unlike the case where the sub-protrusions 72 are disposed in a compressed state, there is no need to strictly manage the protruding amount of the sub-protrusions 72. Therefore, fluctuation of the slipping torque among the variable transmission ratio devices can be suppressed, and this contributes to a reduction in manufacturing costs.

(2) The main protrusions 71 and the sub-protrusions 72 are disposed at even angular intervals in an alternate manner in the circumferential direction of the ring main body 65. Therefore, regardless of the position of the engagement groove 56 which the lock arm 53 engages with, a decrease in the slipping torque can be suppressed.

Second Embodiment

Next, a second embodiment that embodies the present invention is described with reference to FIG. 6(a) to FIG. 6(c). The same configurations as in the first embodiment are provided with the same reference symbols, and description thereof is omitted.

Figure 6A:
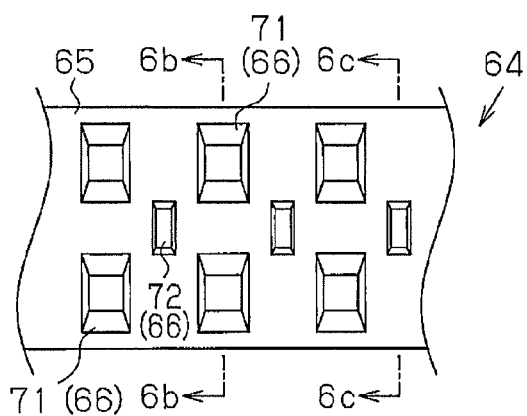
FIG. 6(a) is a partial side view showing a tolerance ring according to a second embodiment of the present invention.
Figures 6B, 6C:
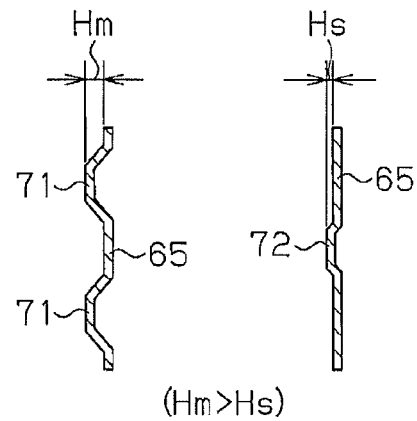
FIG. 6(b) is a partial sectional view taken along a line 6b-6b in FIG. 6(a)
FIG. 6(c) is a partial sectional view taken along a line 6c-6c in FIG. 6(a).
Figure 9:
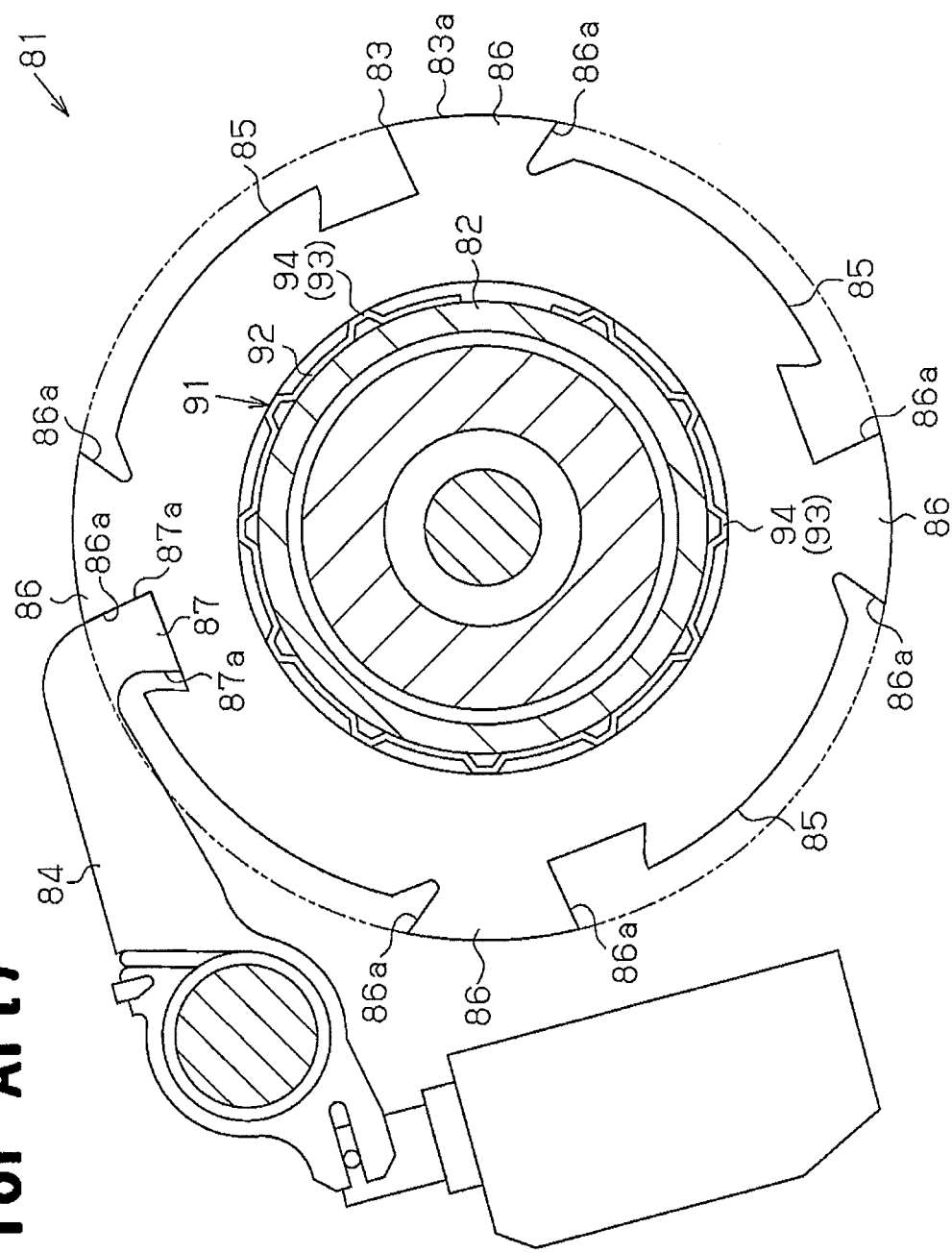
FIG. 9 is a sectional view showing a general configuration of a conventional locking device.

As shown in FIG. 6(a) to FIG. 6(c), the main protrusion 71 is respectively formed near each of open ends of the ring main body 65. The main protrusions 71 are disposed at a predetermined interval in the axial direction of the ring main body 65.

The second embodiment provides the following effects in addition to the effects of (1) and (2) described above.

(3) An impact is applied to the lock holder 52 and the axis of the lock holder 52 may be tilted with respect to the axis of the motor shaft 34. In this case, the contact states between the main protrusions 71, sub-protrusions 72 and the lock holder 52 become uneven, and frictional resistance between the protrusions 71 and 72 and the lock holder 52 may be reduced. In this regard, in the second embodiment, by forming the main protrusions 71 as described above, the lock holder 52 can be made hard to tilt with respect to the motor shaft 34 in comparison with the case where the main protrusions 71 and the sub-protrusions 72 are formed as in the first embodiment. Therefore, a reduction in the frictional resistance between the both protrusions 71 and 72 and the lock holder 52 can be suppressed.

Third Embodiment

Next, a third embodiment that embodies the present invention is described with reference to FIG. 7(a) to FIG. 7(c). The same configurations as in the first embodiment are provided with the same reference symbols, and description thereof is omitted.

As shown in FIG. 7(a) to FIG. 7(c), the main protrusion 71 is respectively formed near each of both open ends of the ring main body 65. The main protrusions 71 are disposed at a predetermined interval in the axial direction of the ring main body 65. The sub-protrusions 72 are formed substantially into trapezoidal quadrangular pyramids. The sub-protrusion 72 extends from the vicinity of one open end to the vicinity of the other open end of the ring main body 65. The apex of the main protrusion 71 extends along the axis. The sectional shape of the main protrusion 71 orthogonal to the axis is substantially triangular. The main protrusions 71 and the sub-protrusions 72 are formed by plastically deforming the ring main body 65 by means of press working. On an inner peripheral surface 65a of the ring main body 65, at positions corresponding to the main protrusions 71 and the sub-protrusions 72, concavities 71b and 72b are formed, respectively.

As shown by hatching with dots in FIG. 8, between the inner peripheral surface 65a of the ring main body 65 and an outer peripheral surface 34a of the motor shaft 34, grease 73 for lubrication is present. The outer peripheral surface 34a of the motor shaft 34 is a contact surface which the inner peripheral surface 65a is brought into contact with. In FIG. 8, the tolerance ring 64 is illustrated in an exaggerated manner. On the outer peripheral surface 34a of the motor shaft 34, an annular groove 74 extending in the circumferential direction is formed. The annular groove 74 is formed to be opposite to the vicinities of the centers in the longitudinal direction of the sub-protrusions 72.

According to the above-described variable transmission ratio device 15, in a case where an abnormality occurs in the wave gear mechanism 26 in a locked state made by the locking device 51, when a torque equal to or more than the slipping torque is input, the inner peripheral surface 65a of the tolerance ring 64 becomes a slipping surface, and the motor shaft 34 and the lock holder 52 are allowed to rotate relative to each other. Thus, even in an abnormal state, a steering operation can be continuously performed.

The third embodiment provides the following operation and effect in addition to the effects of (1) and (2) of the first embodiment and (3) of the second embodiment.

(4) The grease 73 is present between the inner peripheral surface 65a of the ring main body 65 and the outer peripheral surface 34a of the motor shaft 34. On the outer peripheral surface 34a of the motor shaft 34, an annular groove 74 is formed at a position opposite to the concavities 72b of the ring main body 65. With this configuration, in the concavities 72b and the annular groove 74, the grease 73 can be stored. Specifically, a sufficient amount of the grease 73 can be secured between the inner peripheral surface 65a of the ring main body 65 and the outer peripheral surface 34a of the motor shaft 34. Therefore, when a torque equal to or more than the slipping torque is input, the motor shaft 34 and the lock holder 52 are allowed to rotate relative to each other. Therefore, even when the wave gear mechanism 26 is in an abnormal state, a steering operation can be continuously performed.

The first to third embodiments may be modified as follows.

In each embodiment, the ring main body 65 of the tolerance ring 64 may be formed into a ring shape (O-shape).

In each embodiment, the main protrusions 71 and the sub-protrusions 72 are not necessarily formed in an alternate manner. Further, the main protrusions 71 and the sub-protrusions 72 are not necessarily formed at even angular intervals in the circumferential direction.

In the second and third embodiments, the sub-protrusion 72 may be respectively formed near each of the open ends of the ring main body 65, and the sub-protrusions 72 may be disposed at a predetermined interval in the axial direction of the ring main body 65. Alternatively, both of the main protrusions 71 and the sub-protrusions 72 may be formed as described above. In this case, the same operation and effect as in (3) of the second embodiment are obtained.

In the third embodiment, the annular groove 74 may be formed at a position opposite to only the concavities 71b of the main protrusions 71 or opposite to both of the concavities 71b and 72b.

In each embodiment, the spring-like portions 66 may consist of three or more kinds of protrusions the protruding amounts of which are different from each other.

In each embodiment, when the protruding amount Hs of the sub-protrusions 72 is smaller than the protruding amount Hm of the main protrusions 71 in a state where the lock holder 52 is assembled coaxially with the motor shaft 34, the sub-protrusions 72 may be disposed in a compressed state. With this configuration, the main protrusions 71 near a portion to which an impact is applied are compressed to near the limit of the elastically deformable range. Therefore, the increased amount of the elastic forces according to an increase in the compressed amount becomes smaller. On the other hand, the increased amount of the elastic forces according to an increase in the compressed amount of the sub-protrusions 72 hardly becomes smaller. Therefore, as compared with the case where all protruding amounts of the main protrusions 71 and the sub-protrusions 72 are set to be the same, an increased amount of the elastic forces according to an increase in the compressed amount can be made larger. Specifically, at the side opposite to the portion to which an impact is applied, the compressed amounts of the main protrusions 71 and the sub-protrusions 72 decrease and the elastic forces become smaller, and on the other hand, near the portion to which the impact is applied, an increased amount of the elastic forces according to an increase in the compressed amount of the main protrusions 71 and the sub-protrusions 72 does not become smaller. Therefore, a decrease in the frictional resistance of the whole tolerance ring 64 can be suppressed, and a decrease in the slipping torque can be suppressed.

In each embodiment described above, the main protrusions 71 and the sub-protrusions 72 may be formed to protrude radially inward from the ring main body 65.

In each embodiment described above, the present invention may be embodied as, in addition to a variable transmission ratio device, a torque limiter that includes a shaft-like first rotating member, a second rotating member that is fitted on the first rotating member, and a tolerance ring disposed between the first and second rotating members, and limits torque transmission between the first and second rotating members. For example, the present invention may be embodied as a device including a worm wheel as a second rotating member constituting a worm reducer, a shaft as a first rotating member to which the worm wheel is fixed, and a tolerance ring disposed between the worm wheel and the shaft.

The invention claimed is:

1. A torque limiter including a shaft-shaped first rotating member, a second rotating member fitted on an outer periphery of the first rotating member, and a tolerance ring interposed between the first rotating member and the second rotating member, where relative rotation of the first rotating member and the second rotating member is restricted or allowed based on frictional resistance of the tolerance ring, wherein the tolerance ring includes a ring main body extending in a circumferential direction of each rotating member and on the ring main body, spring-like portions elastically deformable in a radial direction are formed, and according to elastic forces of the spring-like portions, frictional resistance is caused between the ring main body and the first rotating member or second rotating member, the spring-like portions consist of a plurality of main protrusions disposed in a compressed state between the first rotating member and the second rotating member and a plurality of sub-protrusions the protruding amount of which is smaller than that of the main protrusions, on the ring main body, concavities are formed by the main protrusions and the sub-protrusions, grease is interposed between the concave peripheral surfaces of the concavities and contact surfaces of the first rotating member which are brought into contact with the concave peripheral surfaces, and on the contact surfaces, an annular groove extending in the circumferential direction of the first rotating member is formed, and the annular groove is formed at a position opposite to at least one of the main protrusions and the sub-protrusions.

2. The torque limiter according to claim 1, wherein the sub-protrusions are disposed in an uncompressed state between the first rotating member and the second rotating member.

3. The torque limiter according to claim 1, wherein the main protrusions and the sub-protrusions are disposed at even angular intervals in an alternate manner in the circumferential direction of the ring main body.

4. The torque limiter according to claim 1, wherein at least one of the main protrusions and sub-protrusions are disposed near the open ends of the ring main body at an interval in the axial direction of the ring main body.

* * * * *